United States Patent
Bulusu et al.

(10) Patent No.: US 11,243,782 B2
(45) Date of Patent: Feb. 8, 2022

(54) KERNEL SOFT RESET USING NON-VOLATILE RAM

(71) Applicant: Microsoft Technology Licensing, LLC, Redmond, WA (US)

(72) Inventors: Mallik Bulusu, Bellevue, WA (US); Bryan Kelly, Carnation, WA (US); Tom Long Nguyen, Auburn, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 971 days.

(21) Appl. No.: 15/378,406

(22) Filed: Dec. 14, 2016

(65) Prior Publication Data
US 2018/0165101 A1 Jun. 14, 2018

(51) Int. Cl.
*G06F 9/4401* (2018.01)
*G06F 8/658* (2018.01)
(Continued)

(52) U.S. Cl.
CPC ............ *G06F 9/4418* (2013.01); *G06F 8/656* (2018.02); *G06F 8/658* (2018.02); *G06F 9/442* (2013.01);
(Continued)

(58) Field of Classification Search
CPC ... G06F 9/44; G06F 11/14; G06F 8/65; G06F 2009/45
See application file for complete search history.

(56) References Cited

U.S. PATENT DOCUMENTS

| 6,119,200 A | 9/2000 | George |
| 7,900,090 B2 | 3/2011 | Agrawal et al. |

(Continued)

FOREIGN PATENT DOCUMENTS

| CN | 103221919 A | 7/2013 |
| CN | 104185836 A | 12/2014 |

(Continued)

OTHER PUBLICATIONS

Gustavo Duarte, How Computers Boot Up, Jun. 5, 2008, https://manybutfinite.com/post/how-computers-boot-up/.*

(Continued)

*Primary Examiner* — Paul Yen
(74) *Attorney, Agent, or Firm* — Ogilvie Law Firm

(57) ABSTRACT

Technologies are described which permit kernel updates or firmware fixes, and include re-initialization of kernel data structures, without losing user context information that has been created by services, virtual machines, or user applications. Tailored code in a server or other computing system sets a kernel soft reset (KSR) indicator and saves the user context to non-volatile storage. When a KSR is underway, boot code skips the power on self-test and similar initializations (thereby reducing downtime), loads a kernel image, initializes kernel data structures, restores the user context, and passes control to the initialized kernel to continue computing system operation with the same user context. Device drivers may also be re-initialized. The loaded kernel may use newly fixed firmware, or may have a security patch installed, for instance. The non-volatile storage may operate at RAM speed, e.g., it may include NVDIMM memory. The kernel may be validated before receiving control.

20 Claims, 7 Drawing Sheets

(51) Int. Cl.
  *G06F 11/14*   (2006.01)
  *G06F 8/656*   (2018.01)
  *G06F 9/455*   (2018.01)

(52) U.S. Cl.
  CPC .......... *G06F 9/4403* (2013.01); *G06F 9/4408* (2013.01); *G06F 9/4416* (2013.01); *G06F 11/1417* (2013.01); *G06F 11/1433* (2013.01); *G06F 11/1438* (2013.01); *G06F 11/1441* (2013.01); *G06F 2009/45575* (2013.01)

(56) References Cited

U.S. PATENT DOCUMENTS

| | | | |
|---|---|---|---|
| 8,789,034 B1* | 7/2014 | Emelyanov | G06F 9/45558 717/169 |
| 9,251,003 B1 | 2/2016 | Gupta et al. | |
| 9,348,705 B1 | 5/2016 | Wu et al. | |
| 2002/0144050 A1 | 10/2002 | Zimmer et al. | |
| 2003/0070115 A1 | 4/2003 | Nguyen et al. | |
| 2003/0079138 A1 | 4/2003 | Nguyen et al. | |
| 2004/0034764 A1 | 2/2004 | Bulusu et al. | |
| 2004/0193863 A1 | 9/2004 | Zimmer et al. | |
| 2005/0160257 A1* | 7/2005 | Kruger | G06F 8/64 713/2 |
| 2006/0242399 A1 | 10/2006 | Zimmer et al. | |
| 2006/0288197 A1 | 12/2006 | Swanson et al. | |
| 2007/0074053 A1 | 3/2007 | Bulusu et al. | |
| 2007/0157015 A1 | 7/2007 | Swanson et al. | |
| 2007/0300007 A1 | 12/2007 | Bulusu et al. | |
| 2009/0124375 A1* | 5/2009 | Patel | G07F 17/32 463/29 |
| 2009/0172381 A1 | 7/2009 | Zimmer et al. | |
| 2012/0036308 A1 | 2/2012 | Swanson et al. | |
| 2012/0054742 A1 | 3/2012 | Eremenko et al. | |
| 2012/0124357 A1 | 5/2012 | Zimmer et al. | |
| 2012/0159136 A1 | 6/2012 | Rothman et al. | |
| 2012/0166840 A1 | 6/2012 | Rothman et al. | |
| 2014/0006764 A1 | 1/2014 | Swanson et al. | |
| 2014/0157264 A1 | 6/2014 | Russinovich et al. | |
| 2015/0067311 A1* | 3/2015 | Forristal | G06F 11/1433 713/2 |
| 2015/0178097 A1 | 6/2015 | Russinovich | |
| 2015/0277937 A1 | 10/2015 | Swanson et al. | |
| 2016/0011802 A1 | 1/2016 | Berke | |
| 2016/0092203 A1* | 3/2016 | Filali-Adib | G06F 9/4856 717/171 |
| 2016/0092691 A1 | 3/2016 | Thom et al. | |
| 2016/0118121 A1 | 4/2016 | Kelly et al. | |
| 2016/0179375 A1 | 6/2016 | Kirvan | |
| 2017/0372075 A1* | 12/2017 | Lu | G06F 1/24 |

FOREIGN PATENT DOCUMENTS

| | | |
|---|---|---|
| CN | 105830020 A | 8/2016 |
| WO | 2015065417 A1 | 5/2015 |

OTHER PUBLICATIONS

Gustavo Duarte, The Kernel Boot Process, Jun. 23, 2008, https://manybutfinite.com/post/kernel-boot-process/.*

Non-Volatile Random Access Memory (NVRAM), Techopedia, published Oct. 4, 2015, available at https://web.archive.org/web/20151004102426/https://www.techopedia.com/definition/2794/non-volatile-random-access-memory-nvram. (Year: 2015).*

Microsoft Computer Dictionary, p. 31 (5th ed. 2002), available at https://burmastarrecords.files.wordpress.com/2009/12/microsoft_computer_dictionary_fifth_edition1.pdf (defining an "application").*

IEEE 100: The Authoritative Dictionary of IEEE Standards Terms, p. 46 (7th ed. 2000), available at http://ieeexplore.ieee.org/stamp/stamp.jsp?tp=&arnumber=4116787 (defining an "application").*

"International Search Report and Written Opinion Issued in PCT Application No. PCT/US17/064983", dated May 9, 2018, 18 Pages.

Sinha, Sushovon, "UEFI Secure Boot in Windows 8.1", Retrieved From: https://answers.microsoft.com/en-us/windows/forum/windows8_1-security-winsec/uefi-secure-boot-in-windows-81/65d74e19-9572-4a91-85aa-57fa783f0759 :, Nov. 12, 2013, 34 Pages.

Sun, et al., "Intel FSP and UEFI Integration", In Book Embedded Firmware Solutions: Development Best Practices for The Internet of Things, Jan. 1, 2015, 32 Pages.

"Advanced Configuration and Power Interface", retrieved from <<https://en.wikipedia.org/wiki/Advanced_Configuration_and_Power_Interface>>, Sep. 6, 2016, 6 pages.

Narayanan, et al., "Whole-System Persistence", In Proceedings of the 17th International Conference on Architectural Support for Programming Languages and Operating Systems, Mar. 3, 2012, 10 pages.

Proctor, Adrian, "NV-DIMM: Fastest Tier in Your Storage Strategy", In White Paper of Viking Technology, Mar. 2, 2013, pp. 1-7.

Venkatesan, et al., "Ex-Tmem: Extending Transcendent Memory with Non-volatile Memory for Virtual Machines", In Proceedings of IEEE International Conference on High Performance Computing and Communications, Aug. 20, 2014, 8 pages.

O'Reilly, Jim, "NVDIMM and RDMA offer significant virtualization advantages", Published on: Mar. 2016, retrieved from <<http://searchservervirtualization.techtarget.com/tip/NVDIMM-and-RDMA-offer-significant-virtualization-advantages>>.

"Advanced Configuration and Power Interface Specification", Revision 5.1, Jul. 2014, retrieved from <<http://www.uefi.org/sites/default/files/resources/ACPI_5_1release.pdf>>.

Mario Martinez, "NVDIMM/NVRAM Next Generation", 2015, 10 pages, retrieved from <<http://www.flashmemorysummit.com/English/Collaterals/Proceedings/2015/20150812_S202A_Martinez.pdf>>.

"BIOS", 14 pages, retrieved from <<https://en.wikipedia.org/wiki/BIOS>>, Sep. 22, 2016.

"Booting", 16 pages, retrieved from <<https://en.wikipedia.org/wiki/Booting>>, Sep. 22, 2016.

"Booting an Intel Architecture System, Part II: Advanced Initialization", 5 pages, Jan. 17, 2012, retrieved from <<http://www.drdobbs.com/booting-an-intel-architecture-system-par/232400476>>.

"Coreboot", 7 pages, retrieved from <<https://en.wikipedia.org/wiki/Coreboot>>, Sep. 22, 2016.

"Hardware Diagnostics and Power on Self Tests", 6 pages, no later than Sep. 27, 2016, retrieved from <<http://www.eventhelix.com/RealtimeMantra/FaultHandling/hardware_diagnostics.htm#.V-ruDLnrsVs>>.

"Factory reset", 3 pages, retrieved from <<https://en.wikipedia.org/wiki/Factory_reset>>, Sep. 17, 2016.

"Hardware virtualization", 6 pages, retrieved from <<https://en.wikipedia.org/wiki/Hardware_virtualization>>, May 13, 2016.

"Hibernation (computing)", 5 pages, retrieved from <<https://en.wikipedia.org/wiki/Hibernation_(computing)>>, Sep. 22, 2016.

"Kexec", 2 pages, retrieved from <<https://en.wikipedia.org/wiki/Kexec>>, Aug. 25, 2016.

"KGraft", 3 pages, retrieved from <<https://en.wikipedia.org/wiki/KGraft>>, Sep. 14, 2016.

"Kpatch", 4 pages, retrieved from <<https://en.wikipedia.org/wiki/Kpatch>>, Sep. 14, 2016.

Peter Kuo and Niki Rahimi, "Booting and Shutting Down for SuSE Linux Enterprise Server", Jul. 15, 2005, 3 pages, retrieved from <<http://www.informit.com/articles/article.aspx?p=401140&seqNum=4>>.

"Memory map", 3 pages, retrieved from <<https://en.wikipedia.org/wiki/Memory_map>>, Aug. 15, 2016.

"System Power States", 7 pages, retrieved from <<https://msdn.microsoft.com/en-us/library/windows/desktop/aa373229(v=vs.85).aspx>>, no later than Sep. 27, 2016.

"ACPI Based 'Platform Communication Channel' (PCC) Mechanism", Oct. 2015, 15 pages, retrieved from <<https://www.google.com/url?sa=t&rct=j&q=&esrc=s&source=web&cd=1&ved=0ahUKEwjU9YGHqbDPAhUO4mMKHRieDj0QFggcMAA&url=https%3A%2F%2Ffirmware.intel.com%2Fsites%2Fdefault%2Ffiles%

(56) References Cited

OTHER PUBLICATIONS

2Fresources%2FPCC%2520White%2520Paper_0.pdf&usg= AFQjCNGI89P-nU3hQ4vyu9JJYrQCMXCBrA&bvm=bv. 134052249,d.cGc&cad=rja>>.
"Persistence (computer science)", 4 pages, retrieved from <<https://en.wikipedia.org/wiki/Persistence_(computer_science)>>, Jun. 5, 2016.
"Power-on self-test", 8 pages, retrieved from <<https://en.wikipedia.org/wiki/Power-on_self-test>>, Sep. 5, 2016.
"Reboot (computing)", 5 pages, retrieved from <<https://en.wikipedia.org/wiki/Reboot_(computing)>>, Aug. 4, 2016.
Mark E. Russinovich, et al., "Troubleshooting Windows Startup and Shutdown Problems", 53 pages, Sep. 15, 2012, retrieved from <<https://www.microsoftpressstore.com/articles/article.aspx?p=2201310>>.
Ashwin Chaugule, "pcc.c", retrieved from <<http://www.staroceans.org/projects/beagleboard/drivers/mailbox/pcc.c>>, 7 pages, 2014.
Michael S. Tsirkin, "How to reserve guest physical region for ACPI", retrieved from <<https://patchwork.kernel.org/patch/7925951/>>, Dec. 28, 2015, 49 pages.
"Unified Extensible Firmware Interface", 13 pages, retrieved from <<https://en.wikipedia.org/wiki/Unified_Extensible_Firmware_Interface>>, Sep. 26, 2016.
"Where is the bios stored?", Jan. 23, 2016, 2 pages, retrieved from <<https://www.quora.com/Where-is-the-bios-stored>>.
Tompsonn, "Windows: the startup and shutdown process", 14 pages, Dec. 24, 2013, retrieved from <<http://www.overclock.net/t/1453560/windows-the-startup-and-shutdown-process>>.
"Office Action Issued in Indian Patent Application No. 201947023344", dated Sep. 15, 2021, 9 Pages.
"First Office Action and Search Report Issued in Chinese Patent Application No. 201780077227.8", dated Sep. 30, 2021, 19 Pages.

\* cited by examiner

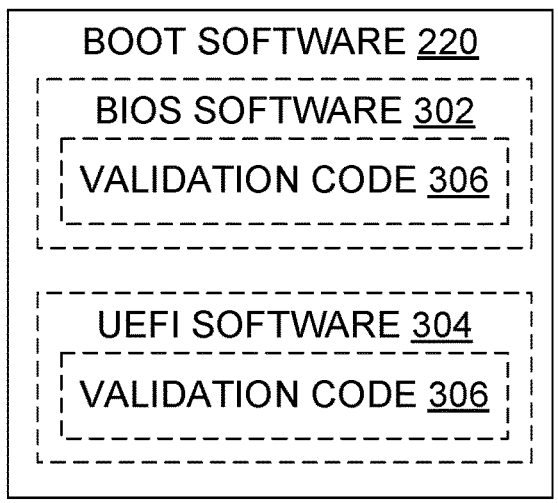
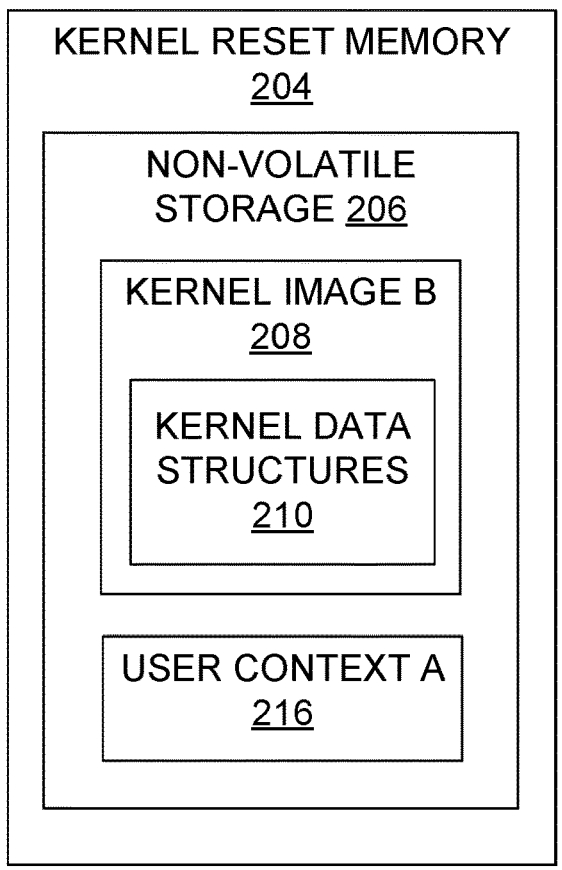
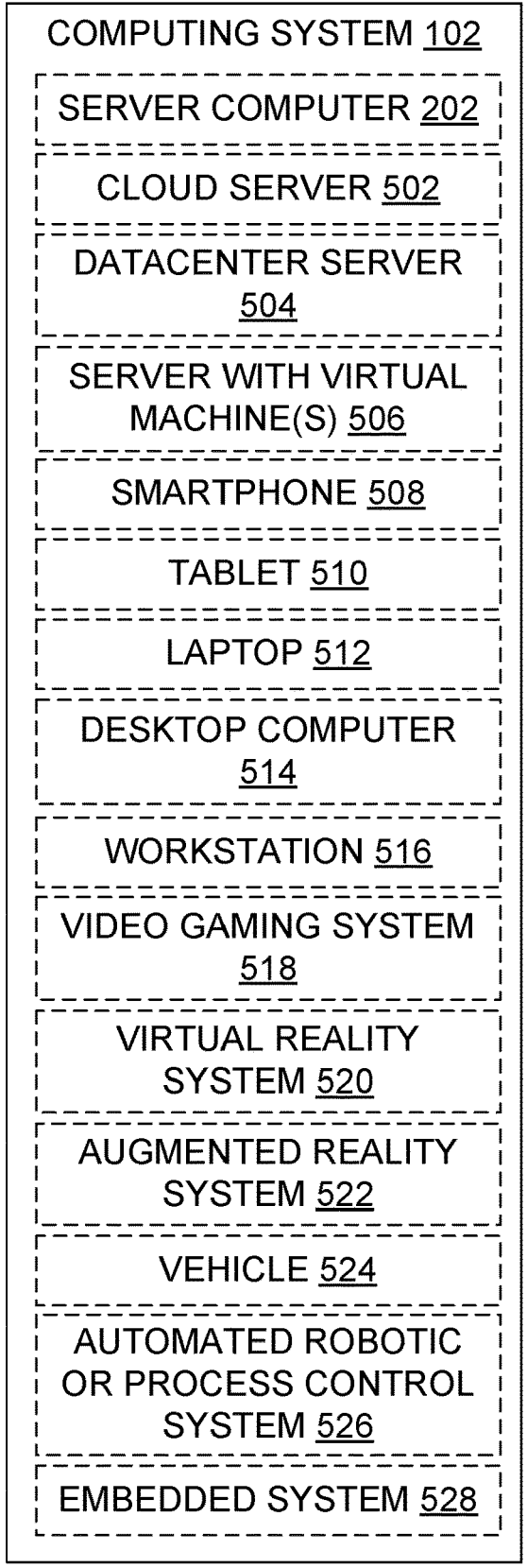
Fig. 3
Fig. 4
Fig. 5

NORMAL RESET SEQUENCE 600

MEMORY PRESERVED REBOOT FLOW 700

KERNEL SOFT RESET USING NON-VOLATILE RAM

BACKGROUND

Use of a computer is normally preceded at some point by booting the computer. Computer booting typically involves a sequence of steps. These may include power on self-tests and platform initialization performed to identify the hardware available and initialize it, locating and loading a boot manager which locates and runs a system loader which locates and runs a kernel, initializing device drivers, and other steps. After the kernel and basic drivers are initialized and running, additional steps to make use of the computer may include initializing and running virtual machines and support services such as storage, networking, directory, and other services. The virtual machines may in turn run their own operating systems, which in turn support applications such as user applications to perform transactions, scientific computations, simulations, databases, and many other kinds of computational efforts.

SUMMARY

Some technologies described herein are directed to the technical activity of updating a kernel in a computing system without losing user context that has been created by virtual machines or user applications. Some technologies herein are directed to re-initializing kernel data structures without also re-starting virtual machines or user applications. Some are directed to reducing operations performed after a computing system reset, thereby reducing downtime, while preserving user context created by virtual machines or user applications. Other technical activities pertinent to teachings herein will also become apparent to those of skill in the art.

In some embodiments, a server or other computing system supports a kernel soft reset for updating a kernel without losing user context. The computing system includes a kernel image A, a user context generated during operation of the system under control of kernel image A, and a kernel image B which may differ from kernel image A (updates may also be made to firmware without changing the kernel). At least one processor is present, and an operating memory is present and in operable communication with the processor. The operating memory includes volatile random access memory (RAM) and contains the user context and at least a portion of the kernel image A. A kernel reset memory is also present, with non-volatile storage containing the kernel image B. The kernel reset memory may operate at RAM speeds, e.g., it may include NVDIMM or similar memory. A bitflag, a variable, or another kernel soft reset indicator is also present.

In operation, in this embodiment boot software code checks the kernel soft reset indicator. When the kernel soft reset indicator indicates a kernel soft reset is underway the code (a) loads the kernel image B from the kernel reset memory into the operating memory, (b) initializes kernel data structures of the kernel image B, and (c) passes control to the initialized kernel image B to continue operation of the system with the same user context under control of kernel image B rather than under control of kernel image A. When the kernel soft reset indicator indicates a kernel soft reset is not underway, the boot software code does not pass control to kernel image B to continue operation of the system with the same user context. Instead, it may pass control back to kernel image A, or it may pass control to kernel image B without preserving the user context.

Some embodiments described herein provide or use a kernel soft reset method which includes boot software of a device checking a kernel soft reset indicator. Upon finding that the kernel soft reset indicator indicates a kernel soft reset is underway, a kernel image B is loaded into an operating memory of the device, kernel data structures of the loaded kernel image B are initialized, and control passes to the initialized kernel image B. Then at least a portion of at least one user program is executed in a user context on top of the initialized kernel image B; the user context was previously created during operation of the device under the control of a kernel image A. Thus, the method updates the device from kernel image A to kernel image B without losing the user context and with values being updated in kernel data structures.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating examples of boot software in a computing system such as the one shown in FIG. 2;

FIG. 4 is a block diagram illustrating aspects of a kernel reset memory in a computing system such as the one shown in FIG. 2;

FIG. 5 is a block diagram illustrating examples of computing systems which may be provided with KSR technology;

DETAILED DESCRIPTION

Overview

Figure 1:
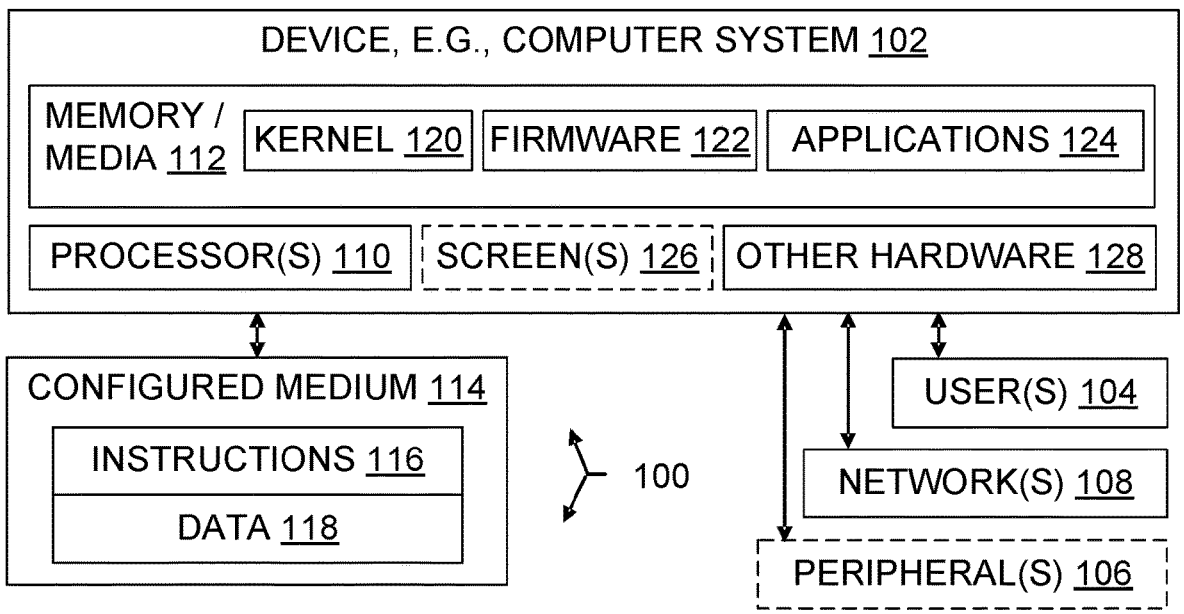
FIG. 1 is a block diagram illustrating a computer system having at least one processor and at least one memory which interact with one another under the control of software, and also illustrating some configured storage medium examples.

High availability (e.g., 99.999% or greater uptime) is a key SLA metric for some cloud providers, and may also be a goal in datacenters used for other purposes. System resets can be very expensive and affect SLA goals. However, system resets may be desirable or even required for a variety of reasons, such as applying security patches, doing system firmware fixes, and making other changes to executable code, configuration values, or data structures that operate in firmware or a kernel. Also, changes to platform policies associated with chipset sticky registers may require a full system reset as opposed to provisions such as a conventional soft reset. Since system reset control flow typically follows traditional pre-boot flows, the memory map from the most recent prior boot is compromised. BIOS operations will shadow pre-boot code over memory regions owned by the previous OS boot instance.

Omitting part of the traditional boot flow in order to optimize uptime or other characteristics of a computing system can lead to data corruptions which are undesirable and sometimes difficult to detect. However, some limited optimizations are known. For example, some optimizations preserve OS context in volatile memory during an S3 sleep state, and then restore the OS context through one or more wake up vectors. This can aid power management, but it does not permit upgrades to the kernel or other changes to executable code, configuration values, or data structures that operate in firmware or in the kernel. System context can also be stored to disk, but the store and restore operations occur at disk speeds which are typically much slower than RAM speed, thus reducing the availability of the computer for running user applications.

Some systems permit so-called "live booting" or "live patching" of a kernel. This passes control to a replacement kernel without a full reboot, which allows upgrades to some kernel code but does not re-initialize kernel data structures the way a full boot would. A full reboot allows changes to executable code, configuration values, or data structures that operate in firmware or in the kernel, but also destroys the user context in applications and virtual machines. A full reboot also performs a power on self-test and other platform discovery, testing, and initialization operations, which can occupy a quarter or more of the time spent rebooting, thus reducing system uptime.

The present disclosure describes and illustrates kernel soft reset (KSR) technologies. The term "kernel soft reset" has particular meaning herein, regardless of any usage that may occur outside this disclosure. Unless specifically indicted otherwise herein, "kernel soft reset" and "KSR" refer to technologies which support changes to executable code, configuration values, or data structures that operate in firmware or in the kernel while preserving application context and avoiding at least part of the power on self-test and other platform discovery, testing, and initialization operations performed during a conventional full boot. One of skill will understand that a given KSR technology or its performance accordingly has one or more of the following characteristics:

Performing the KSR is different from resuming after hibernation because KSR allows booting a different kernel but resuming will resume the same kernel.

Performing the KSR is different from a reboot because KSR maintains the user context (VMs, applications, services) but reboot does not.

The KSR is faster than a reboot, in part because KSR avoids power on self-test.

Performing the KSR is different than live patching or live booting because KSR reinitializes the kernel's internal data structures but live patching and live booting do not.

Although it preserves user context, KSR can be done in some embodiments either with or without saving the user context to non-volatile storage, in that KSR can either use the user context preserved in RAM or else KSR can restore the user context from NVDIMM or HDD.

KSR can be done on a wide variety of devices, to efficiently reboot kernels for a variety of reasons.

KSR technology can be better understood by reference to existing procedures that are used in computing systems 102 like those illustrated in FIG. 1. Systems 102 are discussed in greater detail later herein. It suffices here to note the presence of several components. At least one processor 110 is present, in operable communication with a volatile working memory 112, e.g., RAM, which holds a loaded OS 120, loaded apps 124, and other data when the RAM is powered and which loses that information when electric power to the RAM is lost. A power supply 128 is present, with a mechanical switch and possibly also being under software control. A non-volatile boot memory 112 holds BIOS or EFI or UEFI code 122. The boot memory retains its content regardless of whether it has power. The boot memory code can do at least two things: perform a POST and load a bootloader. POST includes basic checks to see what hardware is present and whether it passes some functionality tests. A bootloader is code that loads an operating system. Non-volatile working memory 112, e.g., a hard disk, is also present in most systems; it holds an OS, apps, and data regardless of whether it has power. Peripherals 106 are also generally present. They typically include at least one input device and one output device, which can be the same device, e.g., a touch screen.

In such systems 102, some existing procedures determine what kernel, kernel data structure values, and user context are used. Several such procedures are discussed below.

Conventional Factory Reset. This procedures restores the system's memories to their original manufactured state. Apps, data, preferences, device drivers, OS patches, etc. added after the original manufacture are all removed from the system, and all the original versions of the OS, apps, preferences, etc. are restored to the system.

Conventional Orderly Shutdown. Basically, this gives running software a chance to prevent data corruption by saving a current version of directories, allocation tables, and other structures that describe the organization of data, and to save the data itself. For example, a shutdown command orders apps and other processes to shutdown, which in turn gives those processes a chance to flush data to non-volatile memory and close any open files, and to release allocated memory back to the OS. A shutdown command also orders device drivers to flush I/O data and current directory information to attached devices. On ACPI compliant systems, the shutdown command may cause issuance of a Power command, which causes NVDIMM to save data from its volatile portion to its non-volatile portion.

Conventional Hibernation. This saves loaded OS code, OS context, loaded application code, and application context from volatile working memory (RAM) into a hibernation file in non-volatile working memory (e.g., disk). Then the power is cut off to the system. RAM content is lost, but the copy on disk survives. To awake from hibernation, power is restored and the saved code and contexts are loaded into RAM from the hibernation file, overwriting whatever was there.

Conventional Sleep. This cuts power to the display and processor and disk but maintains power to volatile working memory (RAM). If power is cut, data is lost. If power is not cut, then to awake from sleep the power is restored to the display and processor and disk; the codes and contexts in RAM are still there.

Conventional Hibernation-sleep-hybrid. This saves loaded codes and context from volatile working memory (RAM) into a hibernation file in non-volatile working memory (e.g., disk). Then the system cuts power to the display and processor and disk but maintains power to volatile working memory (RAM). If power is cut, RAM content is lost, but the copy on disk survives.

Conventional Hard Reboot. Starts with no power, except perhaps to a power supply button. Power is given to the system. Boot memory code (BIOS/EFI/UEFI) performs POST. Then boot memory code loads a bootloader into RAM from a boot device. The bootloader loads an OS into RAM from non-volatile working memory or over a network connection. Anything that was in RAM when the hard reboot began is potentially overwritten.

Conventional Soft Reboot. Starts with power to the system. POST is skipped. Boot memory code loads a bootloader into RAM from a boot device. The bootloader loads an OS into RAM from non-volatile working memory or over a network connection. Anything that was in RAM when the soft reboot began is potentially overwritten.

Some KSR technologies can start either with the system 102 powered or not powered. If the system is not powered, power is given to the system and POST is performed. In either case (initially powered or initially not powered), boot memory code loads a KSR-modified bootloader into RAM from a boot device. The modified bootloader checks to see if a modified (i.e., KSR) shutdown was performed. This check can be done, e.g., using an ACPI PCC mailbox. If a modified shutdown was not performed, then the modified bootloader loads an OS into RAM from non-volatile memory, e.g., disk, overwriting whatever was in RAM. Apps must be reloaded and restarted. This matches a conventional reboot (hard or soft).

However, if a modified shutdown was performed, then the modified bootloader attempts to validate the modified shutdown's results. If they pass, they are loaded; this loads an OS context, any apps that were shutdown, and those app contexts, into RAM from NVDIMM or other non-volatile storage that is not visible to the conventional boot process. The OS is loaded from the boot device, as in conventional reboot. This resembles awaking from hibernation but the loaded context information comes into RAM from dedicated non-volatile storage (KSR reset memory), not from disk. Orderly shutdown can be modified for KSR to have an option to save the OS context, any apps that were shutdown, and those app contexts, from operating memory RAM into NVDIMM or other non-volatile storage, and to then set an indicator (e.g., ACPI flag) that a modified shutdown was performed.

Some embodiments described herein may be viewed in a broader context. For instance, concepts such as booting, context, initialization, preservation, and upgrades may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving booting, context, initialization, preservation, or upgrades are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in computing technology, such as locating, loading, initializing, and running boot software, kernels, and applications. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein utilize an ACPI mailbox or other KSR flag, and some utilize non-volatile memory outside the operating memory used by the operating system and applications. Third, technical effects provided by some embodiments include reduced downtime for changes to executable code, configuration values, or data structures that operate in firmware or in the kernel while preserving application context and avoiding at least part of the power on self-test and other platform discovery, testing, and initialization operations performed during a conventional full boot. Fourth, some embodiments include technical adaptations such as a KSR indicator, and KSR-adapted boot software. Fifth, some embodiments modify technical functionality of a computing environment by adding an alternate control flow which restores user context from a non-volatile storage, re-initializes kernel data structures, and avoids at least part of the conventional boot flow. Sixth, technical advantages of some embodiments include reduced downtime for making changes to executable code, sticky chipset policies, or data structures that operate in firmware or in the kernel. Other advantages will also be apparent to one of skill from the description provided.

Acronyms and abbreviations

Some acronyms and abbreviations are defined below. Others may be defined elsewhere herein or require no definition to be understood by one of skill.

ACPI: advanced configuration and power interface
ALU: arithmetic and logic unit
API: application program interface
APP: application
BIOS: basic input/output system
CD: compact disc
CPU: central processing unit
DC: datacenter
DVD: digital versatile disk or digital video disc
EFI: extensible firmware interface
FPGA: field-programmable gate array
FPU: floating point processing unit
GPU: graphical processing unit
GUI: graphical user interface
HDD: hard disk drive (e.g. solid state, electromechanical, optical)
KSR: kernel soft reset
NUMA: non-uniform memory access
NVDIMM: non-volatile dual inline memory module
OS: operating system
PCC: platform communications channel
PCI: peripheral component interconnect
POST: power on self-test
QPI: quick path interconnect, aka quickpath interconnect
RAM: random access memory ROM: read only memory
SLA: service level agreement
SPI: serial peripheral interface
UEFI: unified extensible firmware interface
VM: virtual machine
Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to emphasize that a given chip may have one or more processors; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, and similar hardware interface software. BIOS code and EFI or UEFI code may be considered functionally part of a kernel, but are also called out separately herein because they typically execute earlier in a boot or reset procedure than kernel code that is larger and is loaded from a boot device rather than from the motherboard or similar storage often reserved for BIOS/EFI/UEFI code.

"Code" means processor instructions, data (which includes constants, variables, and data structures), or both instructions and data. "Code" and "software" are used interchangeably herein. Executable code, interpreted code, and firmware are some examples of code.

"Logic" may include special-purpose hardware or software or firmware, for example.

"Capacity" means use or control of one or more computational resources.

"Optimize" means to improve, not necessarily to perfect. For example, it may be possible to make further improvements in a program or an algorithm which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a computing environment which provides functionality or computing resource access to multiple application programs.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

A "hypervisor" is a software platform that runs virtual machines. Some examples include Xen® (mark of Citrix Systems, Inc.), Hyper-V® (mark of Microsoft Corporation), and KVM (Kernel-based Virtual Machine) software.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Procedure" is used interchangeably with "process".

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as locating, validating, loading, and running code, and identifying and initializing system hardware, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as changing, checking, clearing, copying, creating, executing, generating, indicating, initializing, loading, passing control, saving, setting, restoring, updating, validating, or avoiding or applying them, (and changes, changed, checks, checked, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment
102 computer system
104 users
106 peripherals
108 network
110 processor
112 computer-readable storage medium, e.g., RAM, hard disks
114 removable configured computer-readable storage medium
116 instructions executable with processor
118 data
120 kernel
122 firmware
124 applications
126 display screen
128 other hardware
202 server computer
204 kernel reset memory
206 non-volatile storage
208 kernel image
210 kernel data structures
212 operating memory
214 RAM, e.g., volatile random access memory
216 user context, e.g., state information in user processes
218 kernel soft reset indicator, e.g., bitflag or other flag
220 boot software adapted to perform kernel soft reset operations
222 platform communication channel
224 advanced configuration and power interface
226 hard disk, namely, non-volatile storage formatted for operation as a disk (may be solid state disk, optical disk, electromechanical, or otherwise)
302 basic input/output system software
304 unified extensible firmware interface software
306 kernel image validation code
502 cloud server (an example of a server 202)
504 datacenter server (an example of a server 202)
506 server running one or more virtual machines; could be a cloud server or datacenter server or other server
508 smartphone
510 tablet computing device
512 laptop computer
514 desktop computer
516 workstation computer
518 video gaming system
520 virtual reality system
522 augmented reality system
524 vehicle, e.g., car, truck, train, plane, helicopter, ship, submarine, spacecraft, missile, drone, or other vehicle which transports human(s) or physical cargo or data or a combination thereof
526 automated manufacturing system or other robotic system or industrial process control system, e.g., robotic surgery system, robotic search and rescue devices, robotic exploration devices, robotic security devices, robotic surveillance devices, robotic manufacturing systems in factories, nuclear or chemical or semiconductor or other process control systems
528 embedded system, e.g., smart appliance or other Internet-of-Things device; may include robotic or process control systems 526
600 normal computer system reset sequence
602 initiation of shutdown, by human user or by automated process
604 logging users off of system 606 shutting down user processes, including launchable applications, virtual machines, e.g., by saving data to disk, releasing allocated memory of user data structures, closing files and sockets 608 shutting down system processes, including graphical user interface to file system and launchable applications, session manager, security manager, task scheduler, and others 610 shutting down device drivers and I/O system 612 running firmware, may include running BIOS or UEFI firmware 614 performing platform initialization or power on self-test or both 616 running boot manager (616 also refers to boot manager, depending on context of reference)

618 running system loader (618 also refers to system loader, depending on context of reference)

620 loading and initializing device drivers and kernel 622 passing control to kernel at startup point of entry 700 flow of control for reboot in which operating system is preserved in memory (confirmed by system loader)

800 kernel soft reset sequence using NVDIMM or other non-volatile storage to preserve user context 802 save user context to NVDIMM or other non-volatile storage 804 set KSR flag to indicate KSR is underway 806 restore user context to operating memory from non-volatile storage 808 initialize kernel and device drivers 810 pass control to replacement kernel at resumption point, with user context restored and replacement kernel's data structures and device drivers initialized 812 system memory map indicating which portions of memory are present and what software can use a given portion 814 NVDIMM or other non-volatile storage which operates at RAM speed for reads and writes 816 memory available for use by kernel, including operating memory 818 memory holding BIOS or UEFI code and data 900 regular boot flow, that is, without using kernel soft reset technology 902 power turned on to computing system 904 running BIOS code or UEFI code or both 906 running operating system 908 server or other computing device motherboard, namely, location of main processor and at least part of the operating memory, often also the location of BIOS code or UEFI code 910 SPI flash, or code stored therein, or running code stored in an SPI flash memory, depending on context 912 reset vector indicating default location of first code to execute after system is reset 914 CPU initialization code or other logic 916 QPI/memory initialization code or other logic 918 chipset initialization code or other logic 920 advanced CPU initialization code or other logic 922 advanced chipset initialization code or other logic 924 PCI enumeration code or other logic 926 platform initialization code or other logic 928 boot device selection code or other logic 930 kernel initialization code or other logic 932 device driver initialization code or other logic 934 services initialization code or other logic 936 launching or hosting (or both) of one or more virtual machines 938 launching of applications 1000 boot flow using kernel soft reset technology 1100 flowchart illustrating actions that may occur during shutdown, reset, reboot, and similar processes 1102 clearing KSR indicator, thereby indicating that a kernel soft reset is not underway 1104 checking KSR indicator to determine whether a kernel soft reset is underway 1106 validating a kernel image, e.g., checking the image's authenticity, checking permissions, checking for data corruption, checking for tampering 1108 loading a kernel image into operating memory 1110 executing at least a portion of a user program in a particular user context 1112 updating a kernel in a system without losing user context of applications in the system 1114 avoiding performing a power on self-test or other platform initialization even though the computer system has been reset and control is being passed to user applications after the reset 1116 reducing downtime in connection with a reset, namely, time in which the system is not able to run applications or virtual machines 1118 applying a security patch to a kernel or other part of an operating system 1120 security patch 1122 applying a fix to firmware in the system 1124 fix to apply to firmware, or fix as applied to firmware 1126 changing a platform policy 1128 platform policy enforced at least in part by the operating system 1130 avoiding reinitializing a service after a system reset 1132 service supported or provided at least in part by a kernel, e.g., a service which performs alerting, authentication, authorization, capacity provisioning, content delivery, database operations, deployment, fault recovery, infrastructure-as-a-service operations, load balancing, messaging, monitoring, networking, parallel processing, payment processing, platform-as-a-service operations, software-as-a-service operations, storage management, or other operations 1134 avoiding reinitializing a virtual machine after a system reset 1136 virtual machine 1138 avoiding reinitializing an application program after a system reset 1140 reset system by passing control to or through reset vector 1142 device driver Operating Environments With reference to FIG. 1, an operating environment 100 for an embodiment, which may be part of a cloud or datacenter or other computing facility, includes at least one computer system 102. The computer system 102 may be a multiprocessor computer system, or not. An operating environment may include one or more machines in a given computer system, which may be clustered, client-server networked, and/or peer-to-peer networked within a cloud 100. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations. Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. A user interface may be generated on a local desktop computer, or on a smart phone, for example, or it may be generated from a web server and sent to a client. The user interface may be generated as part of a service and it may be integrated with other services, such as social networking services.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, rebooting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components 128. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar hardware logic components. Unless indicated otherwise, firmware 122 herein encompasses such hardware logic components. Components of an embodiment may be grouped into interacting functional modules based on their inputs, outputs, and/or their technical effects, for example.

In addition to processors 110 (CPUs, ALUs, FPUs, and/or GPUs), memory/storage media 112, an operating environment may also include other hardware 128, such as displays 126, batteries, buses, power supplies, wired and wireless network interface cards, accelerators, racks, and network cables, for instance. A display 126 may include one or more touch screens, screens responsive to input from a pen or tablet, or screens which operate solely for output.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

The kernel 120, firmware 122, applications 124, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Items in dashed outline form, such as peripherals 106 and screens 126, may or may not be physically present in a given embodiment, individually or in any operable combination. Items in dot-dashed outline form, such as warm reset 700 and reset vector 912, may be physically present but are unused by a particular embodiment. Items in dotted outline form, such as the FIG. 10 instances of services 934, launch/host virtual machines 936, and launch applications, are effectively performed or obviated by alternate operations (save 802 and restore 806).

Server Architecture

Figure 2:
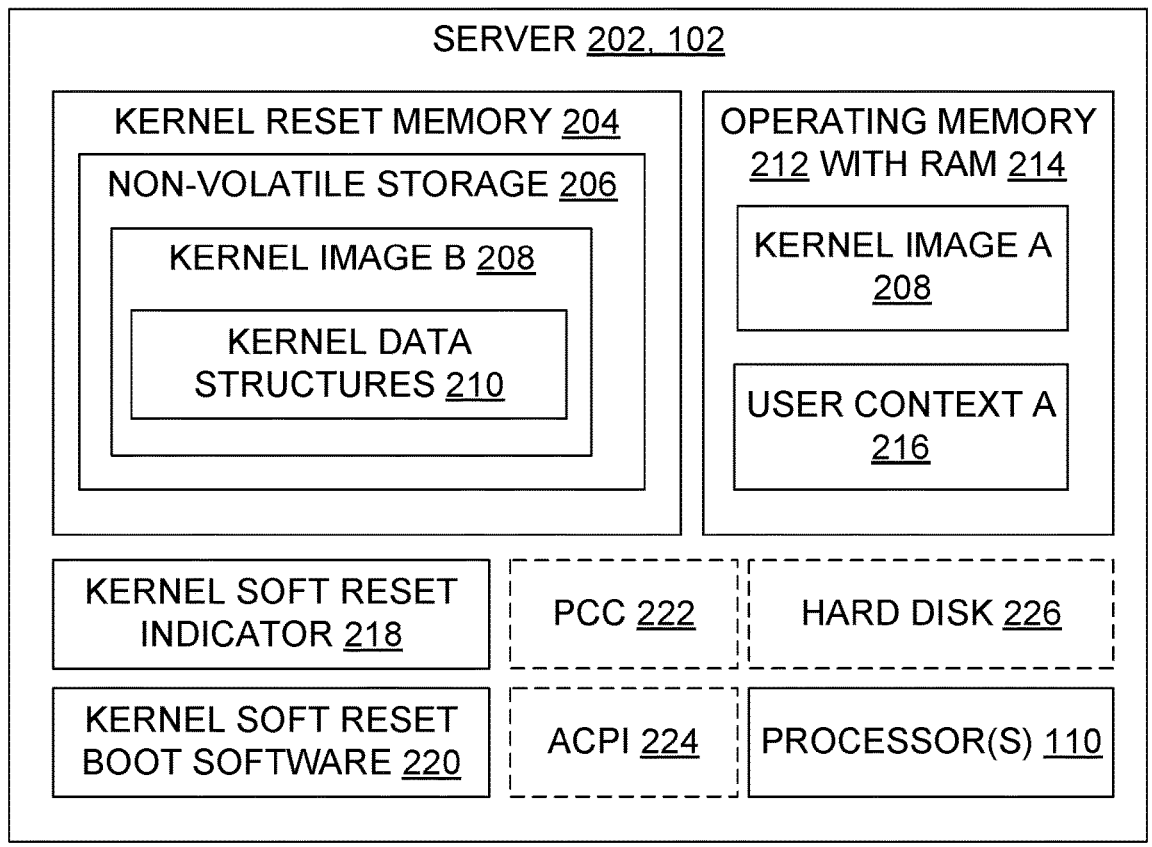
FIG. 2 is a block diagram illustrating aspects of an example server computing architecture which includes kernel soft reset (KSR) technology.

FIG. 2 illustrates aspects of an example server computing architecture which includes kernel soft reset (KSR) technology. Server 202 is an example of a computing system 102. Server 202 includes a kernel reset memory 204, which has non-volatile storage 206 containing a kernel image B 208 having kernel data structures 210 such as system tables containing values that the kernel's operations presume are constant during execution of the kernel after the kernel is initialized. An operating memory 212 with volatile storage 214 contains another kernel image 208, designated kernel image A. The operating memory also contains user context information 216, designated user context A, which was created during operation of the server 202 during execution of kernel image A.

Various relations may occur between the kernel images. In general, they may even be the same image (e.g., when firmware fixes lead to the reset). But kernel image B may be viewed in this example as a replacement for kernel image A. Kernel image B may be entirely different from kernel image A, e.g., one may be from vendor A and the other from vendor B. Or kernel image B may be a result of applying bug fixes or security patches to kernel image A, for example. Or kernel image B may be a reduced or partially crippled version of kernel image A, or kernel image B may be an enhanced version of kernel image A.

The illustrated server 202 also includes a kernel soft reset indicator 218, which may be implemented using a bitflag, a variable, an ACPI 224 mailbox, a PCC 222 variable, or another storage element. The KSR indicator 218 may reside in non-volatile storage 206, e.g., in NVDIMM memory 112 or on a hard disk 226, for example.

Kernel soft reset boot software 220 is present in the illustrated server 202. In addition to conventional boot functionality, the KSR boot software 220 provides functionality for setting the KSR indicator 218 to indicate KSR is underway, saving the user context A, resetting by passing control back through the reset vector, skipping POST after the KSR indicator 218 is checked, and passing control to kernel image B. KSR boot software 220 also restores the user context B. Kernel image B gets initialized, but the applications that contributed to user context A pick up where they left off, instead of being restarted.

As shown in FIG. 3, KSR boot software 220 may include BIOS code 302, UEFI code 304, and validation code 306. BIOS code 302 or UEFI code 304 may function as in a conventional system, with modification to set/check/clear the KSR flag 218, save/restore user context, skip POST, and otherwise perform KSR operations as described herein. Validation code 306 may be in the BIOS/UEFI for enhanced security, but may also be separate, e.g., in a boot loader. Validation code 306 may validate kernel image B by computing and comparing a checksum or hash, for example.

As shown in FIG. 4, in some situations a user context A created under a kernel image A (FIG. 2) is copied into the kernel reset memory 204. This user context A is then made available after a reset to continue execution of applications under the kernel image B.

FIG. 5 illustrates some of the many examples of computing systems 102. Among them are server computers 202, cloud servers 502, datacenter servers 504, and servers running virtual machines 506. One of skill understands that a given machine or system may correspond to one or more of these categories. For instance, a server may be located in a datacenter, may also be available for on-demand third-party use as a cloud server, and may run virtual machines on behalf of one or more third parties when providing cloud computing services. Other illustrated examples include smartphones 508, tablets 510, laptops 512, desktops 514, workstations 516, video gaming systems 518, virtual reality systems 520, augmented reality systems 522, vehicles 524, automated process control or robotic systems 526, and embedded systems 528.

Some embodiments use or provide a computing system 102 which supports a kernel soft reset for updating a kernel without losing user context, with the system including: a kernel image A; a user context 216 generated during operation of the system under control of kernel image A; a kernel image B which differs from kernel image A; at least one processor 110; an operating memory 212, 112 in operable communication with the processor, the operating memory including volatile random access memory (RAM) and containing the user context and at least a portion of the kernel image A; a kernel reset memory 204, 112, the kernel reset memory including non-volatile storage containing the kernel image B; a kernel soft reset indicator 218; and boot software 220. The boot software includes code which upon execution checks the kernel soft reset indicator, and when the kernel soft reset indicator indicates a kernel soft reset is underway the code (a) loads the kernel image B from the kernel reset memory into the operating memory, (b) initializes kernel data structures of the kernel image B, and (c) passes control to the initialized kernel image B to continue operation of the system with the same user context under control of kernel image B rather than under control of kernel image A, and when the kernel soft reset indicator indicates a kernel soft reset is not underway the code does not pass control to kernel image B to continue operation of the system with the same user context.

In some embodiments, the kernel soft reset indicator 218 includes at least one of the following: a flag stored on a hard disk 226, a flag in a platform communication channel 222 shared memory region, an advanced configuration and power interface 224 flag.

In some embodiments, the boot software 220 includes at least one of the following: basic input/output (BIOS) software, unified extensible firmware interface (UEFI) software.

In some embodiments, the computing system 102 includes at least one of the following: a server computer, a cloud server, a datacenter server, a server configured to run multiple virtual machines, a smartphone, a tablet, a laptop, a desktop, a workstation, a video gaming system, a virtual reality system, an augmented reality system, a vehicle, an automated manufacturing system, a process control system, a robotic system, an embedded system.

In some embodiments, the kernel reset memory 204 includes a non-volatile storage containing a copy of the user context, and the boot software includes code which upon execution copies the user context from the kernel reset memory into the operating memory after loading the kernel image B from the kernel reset memory into the operating memory and before continuing operation of the system with the same user context under control of the initialized kernel image B.

In some embodiments, the kernel reset memory 204, 112 containing a copy of the user context includes at least one of the following: NVDIMM-F flash memory, NVDIMM-N byte-addressable memory, NVDIMM-P memory with dynamic RAM and NAND on the same device, NVDIMM-SW memory, NVRAM non-volatile RAM memory.

In some embodiments, the boot software 220 includes code 306 which performs a validation test on at least one of the following: the kernel image B, a copy of the user context.

In some embodiments, the kernel image B differs from the kernel image A with regard to at least one of the following characteristics: security, efficiency, correctness, usability, size, connectivity. For example, kernel image B may include security patches, may require less storage space or run faster than kernel image A, may omit bugs that are present in kernel image A, may have APIs not present in kernel image A, or may support networking protocols not supported in kernel image A.

Some embodiments use or provide a server 202 in a data center or a cloud computing facility, with the server including: a kernel image A; a user context 216 generated during operation of the server under control of kernel image A; a kernel image B; at least one processor 110; an operating memory 212 in operable communication with the processor, the operating memory including volatile random access memory (RAM) and containing the user context and at least a portion of the kernel image A; a kernel reset memory 204, the kernel reset memory including non-volatile storage containing the kernel image B; a kernel soft reset indicator 218 which includes at least one of the following: a flag stored on a hard disk, a flag in a platform communication channel shared memory region, an advanced configuration and power interface flag; and boot software 220. The boot software 220 includes basic input/output (BIOS) software or unified extensible firmware interface (UEFI) software or both, and the boot software includes code which upon execution checks the kernel soft reset indicator, and when the kernel soft reset indicator indicates a kernel soft reset is underway the code (a) loads the kernel image B from the kernel reset memory into the operating memory, (b) initializes kernel data structures in the kernel image B, and (c) passes control to the initialized kernel image B to continue operation of the server with the same user context under control of kernel image B, and when the kernel soft reset indicator indicates a kernel soft reset is not underway the code does not pass control to kernel image B to continue operation of the system with the same user context.

In some embodiments, the kernel reset memory non-volatile storage includes NVDIMM or NVRAM memory or both, and the boot software further includes code which upon execution copies the user context from the kernel reset memory non-volatile storage into the operating memory after loading the kernel image B from the kernel reset memory into the operating memory and before continuing operation of the system with the same user context under control of the initialized kernel image B.

In some embodiments, at least a specified number (e.g., two, three, four, five, or six) of the following characterizations are correct: kernel image B differs from kernel image A by a security patch; kernel image B is at most 90% the size on disk of kernel image A; kernel image B includes code which corrects a bug present in kernel image A; a fix was applied to firmware of the server after creation of the user context and prior to passage of control to the initialized kernel image B; kernel image B differs from kernel image A at most in kernel initialization or driver initialization or both; the user context 216 includes an initialized service; the user context 216 includes an initialized virtual machine; the user context 216 includes an initialized application; an elapsed time from a reset command to when control passes to initialized kernel image B without performing a power on self-test is not more than 65% of an elapsed time from a powered-off state to perform a cold boot of the server which passes control to initialized kernel image B after a power on self-test.

Processes

Examples are provided herein to help illustrate aspects of the technology, but the examples given within this document do not describe all of the possible embodiments. Embodiments are not limited to the specific implementations, arrangements, sequences, flows, features, approaches, or scenarios provided herein. A given embodiment may include additional or different technical features, mechanisms, or data structures, for instance, and may otherwise depart from the examples provided herein.

Figure 6:
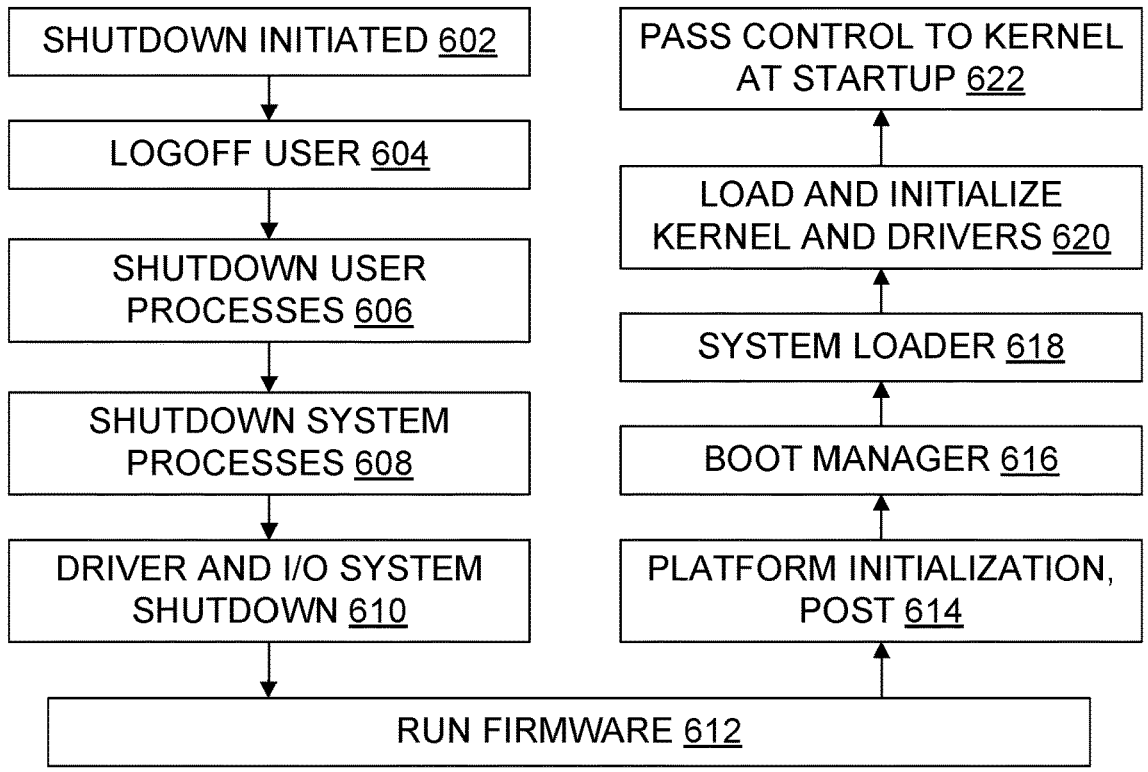
FIG. 6 is a flow diagram illustrating a reset sequence which does not employ full KSR technology.

FIG. 6 illustrates a reset sequence which does not employ full KSR technology. At box 602, a shutdown of the computing system 102 is initiated, either automatically or manually. At box 604, users are logged off. At box 606, user processes such as applications and user-initiated services are shut down. At box 608, system processes such as operating system processes are shut down. At box 610, device driver and I/O systems are shut down. At box 612, control passes to firmware, which typically resides in non-volatile storage on a motherboard of the system 102. At box 614, power on self-test (POST) and other platform initialization occurs. At box 616, control passes to a boot manager, and then passes to a system loader at box 618. At box 620, a kernel and device drivers are loaded and initialized. Then control passes to the initialized kernel at a startup position in the kernel code, at box 622.

Different systems 102 perform different operations at a given point in their reset sequence 600, but one of skill will recognize aspects of the illustrated operations in a given system 102. For example, in a system 102 using a Microsoft Windows® operating system (mark of Microsoft Corporation), user logoff per box 604 and user process shutdown per box 606 and system process shutdown per box 608 may be collectively initiated by a call to an ExitWindowsEx( )routine. On such a system 102, running a system loader per box 618 may also include passing control to Winload.exe or Winload.efi code, and passing control to the initialized kernel at the startup position may include a jump to KiSystemStartup in ntoskrnl.exe. These are merely examples. One of skill will also recognize that aspects of the reset sequence 600 are not specific to a particular operating system. For example, the same firmware and POST and boot manager may be used on a particular system 102 regardless of whether that system boots to a Microsoft Windows® operating system, a Linux® operating system (mark of Linus Torvalds), a Solaris® operating system (mark of Oracle America, Inc.), or some other operating system. Regardless, any user context 216 that was present in the system's operating memory just prior to shutdown initiation 602 is compromised and made unreliable by the reset sequence 600.

Figure 7:
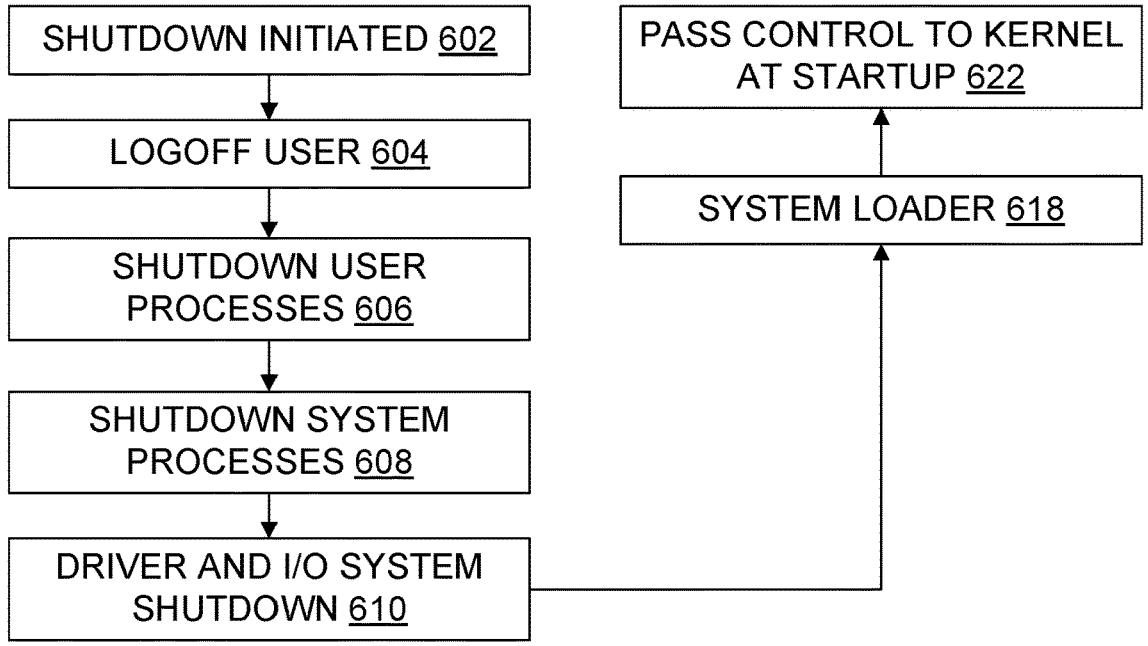
FIG. 7 is a flow diagram illustrating a reboot sequence which avoids power on self-test but does not employ full KSR technology.

FIG. 7 illustrates a reboot sequence 700 which avoids power on self-test 614 but does not employ full KSR technology. The user context 216 that was present in the system's operating memory just prior to shutdown initiation 602 is preserved, so the applications can continue execution after box 622, instead of restarting. However, the same kernel image that ran just prior to shutdown initiation 602 receives control at box 622. The kernel's data structures are not reinitialized, and device drivers are not reinitialized. Also, flow 700 provides no opportunity to make any fixes to the firmware.

Figure 8:
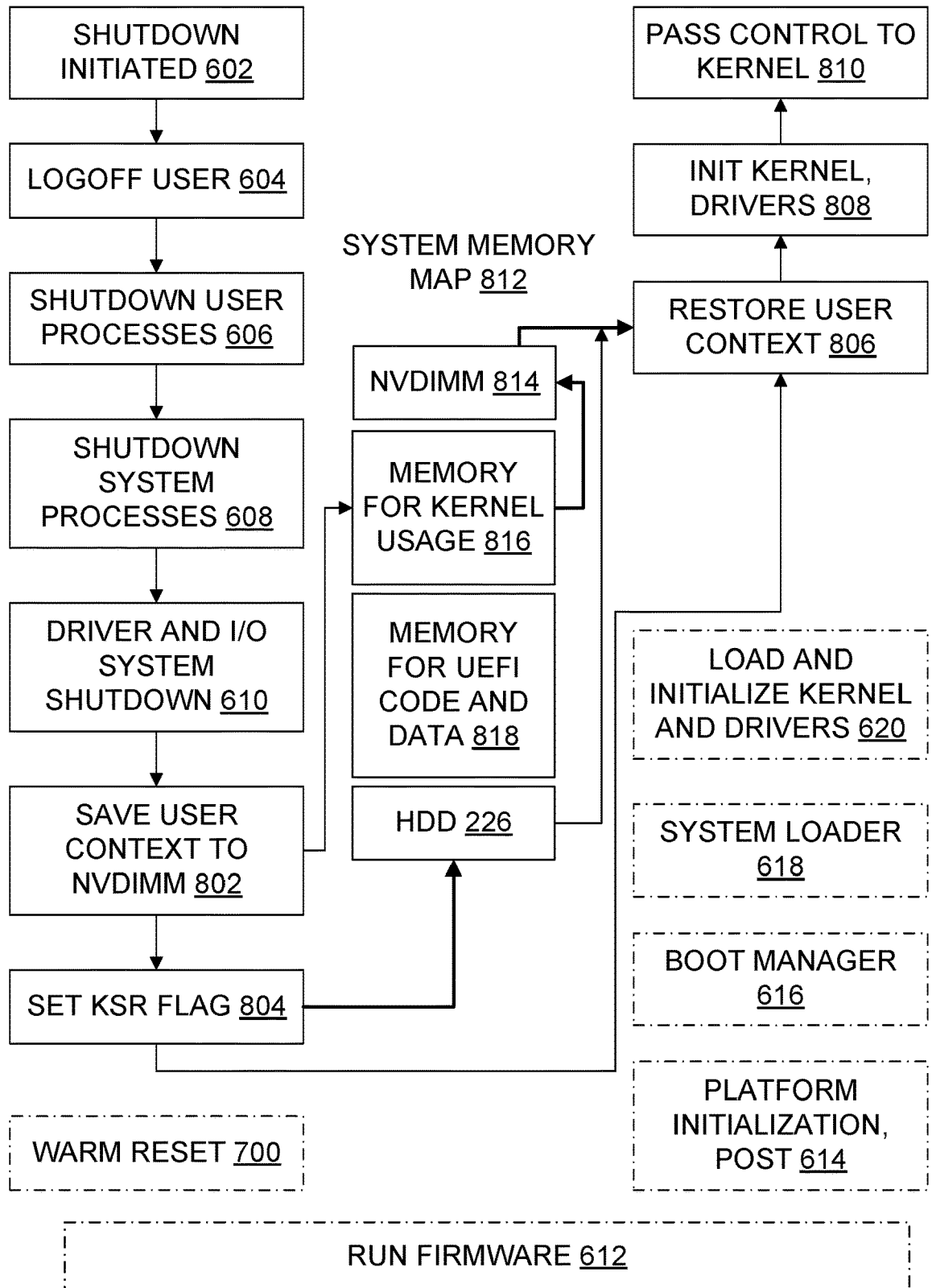
FIG. 8 is a flow diagram illustrating aspects of KSR technology and items it avoids in a reset sequence.

FIG. 8 illustrates aspects of KSR technology and highlights some items the usage of KSR technology can avoid when performing a reset sequence 800. Steps 602 through 610 may proceed as in familiar sequences 600 and 700. However, user context 216 is saved 802 so it can be restored 806 after one or more changes are made, such as substituting a kernel image B for a kernel image A, installing a firmware fix, changing a policy at the chipset level, or changing an aspect of system 102 configuration that will be updated when the kernel is (re)initialized 808. Also, a KSR flag 218 is set 804, so that operations such as POST 614 and reloading the pre-shutdown kernel image are skipped, and so that control will be passed 810 to the kernel at a point which does not invalidate the restored user context.

FIG. 8 also illustrates a system memory map 812, which specifies the various kinds and regions of memory 112 available in the system to various kinds of code. The illustrated system includes NVDIMM memory 814 which holds the user context across the reset, thereby preserving a copy of the user context for restoration to the operating memory 816, 212. In some implementations, the operating memory is whatever memory is defined in a boot firmware memory map, such as an E820 table or EFI memory map. The NVDIMM memory 814 is an example of non-volatile storage 206 in kernel reset memory 204, and is not available to applications or the kernel during execution of applications after the reset. BIOS or UEFI or EFI code is stored in boot ROM or similar firmware memory 818.

Figure 9:
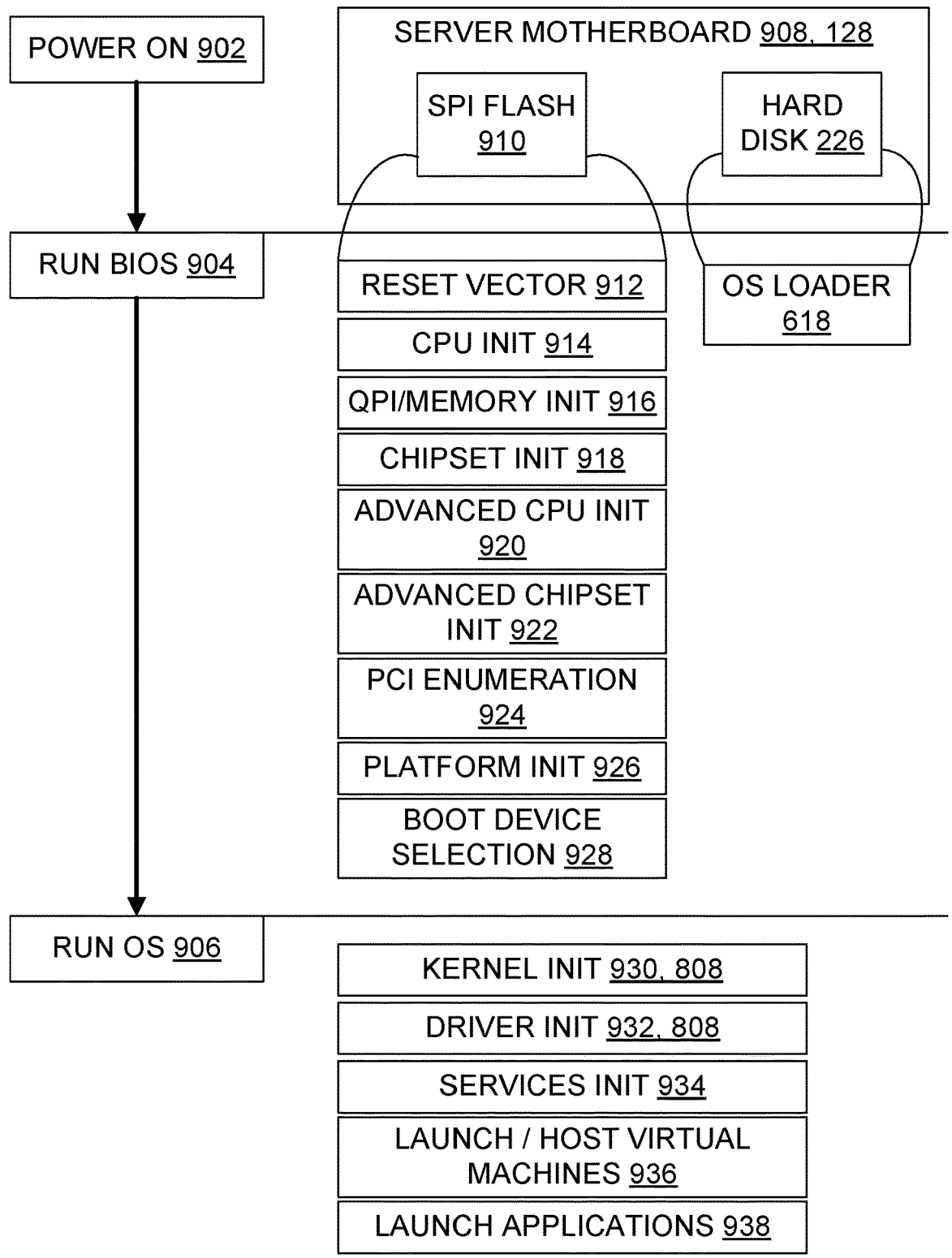
FIG. 9 is a flow diagram illustrating a boot sequence which does not employ full KSR technology.

FIG. 9 illustrates a boot sequence 900 which does not employ full KSR technology, in that user context 216 is not saved and restored, and in that mechanisms such as the KSR flag 218 and POST avoidance are not employed. FIG. 9 corresponds generally to a portion of FIG. 6 including boxes 612 through 622 in a case where power to the system is turned off, in the sense that the power would be off after step 610, and the power would be turned back on right before step 612, and steps 904 and 906 correspond generally to steps 612 through step 622 and to operations somewhat beyond step 622. Running the boot manager 616 and system loader 618 lead to running 906 the operating system. Kernel initialization 930 and driver initialization 932 correspond generally to initialization in step 620 but are called out for separate performance at step 808 of the KSR sequence. Services initialization 934, launching and hosting 936 of virtual machines, and launching 938 of applications would occur after step 622. The running of virtual machines and applications after completion of the regular boot 900 will create user context 216, which can be saved 802 and restored 806 in a subsequent reset sequence 800.

More specifically, after power comes on 902, the system illustrated in FIG. 9 runs 612 firmware 122 that is located in SPI flash memory 910 on a motherboard 908 of the system. The illustrated sequence 900 includes running 904 BIOS firmware which executes operations indicated at reference numerals 912 through 928. A reset vector 912 identifies the code to be run after any system reset. KSR operations such as setting/checking the KSR indicator 218 and saving/restoring user context 216 are spliced into familiar sequences by modifications made to firmware and to the boot manager 616, for example. But in a familiar boot flow such as sequence 900, POST and platform initialization 614 such as familiar versions of operations indicated at reference numerals 914 through 928 are performed. In the illustrated example, these operations include CPU initialization 914, QPI/memory initialization 916, chipset initialization 918, advanced CPU initialization 920, advanced chipset initialization 922, PCI enumeration 924, other platform initializations 926, and boot device selection 928.

Figure 10:
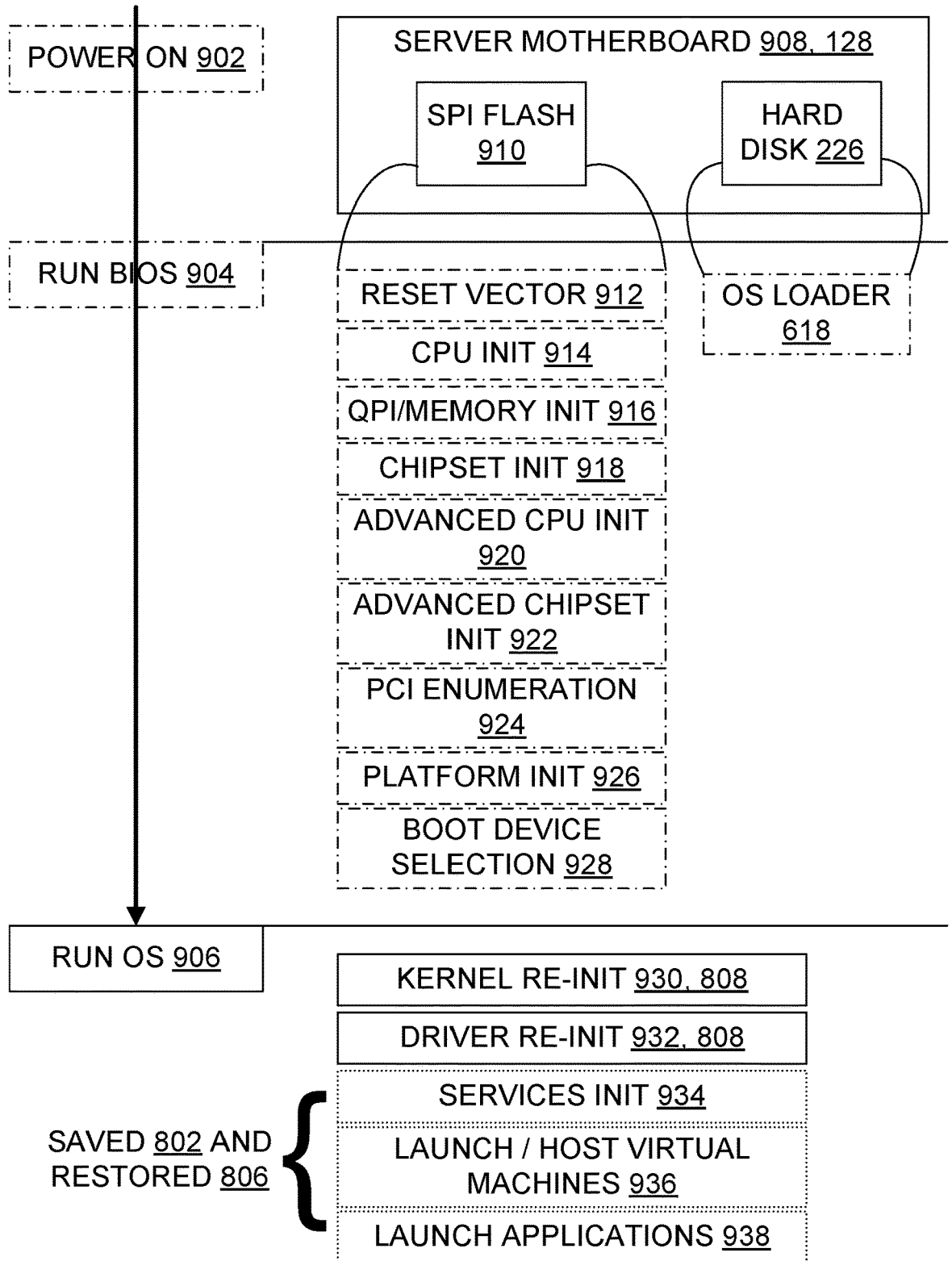
FIG. 10 is a flow diagram illustrating aspects of KSR technology and items it avoids in a boot sequence.

FIG. 10 illustrates aspects of KSR technology, in that POST and platform initialization steps shown in dot-dashed form are avoided, and user context creation steps shown in dotted form are replaced by restoration 806 of a previously saved 802 user context. In some alternatives, the reset vector 912 is still followed under KSR, but the firmware run as a result is adapted to check for the KSR flag and avoid (i.e., skip) steps 914 through 928 when the KSR flag is set. In some alternatives, the OS loader 618 is still called under KSR, but the OS loader is adapted to check for the KSR flag and to pass control to the OS at a point that will continue execution under the restored user context instead of operating as if no applications or virtual machines have yet been launched under the current instance of the OS.

Figure 11:
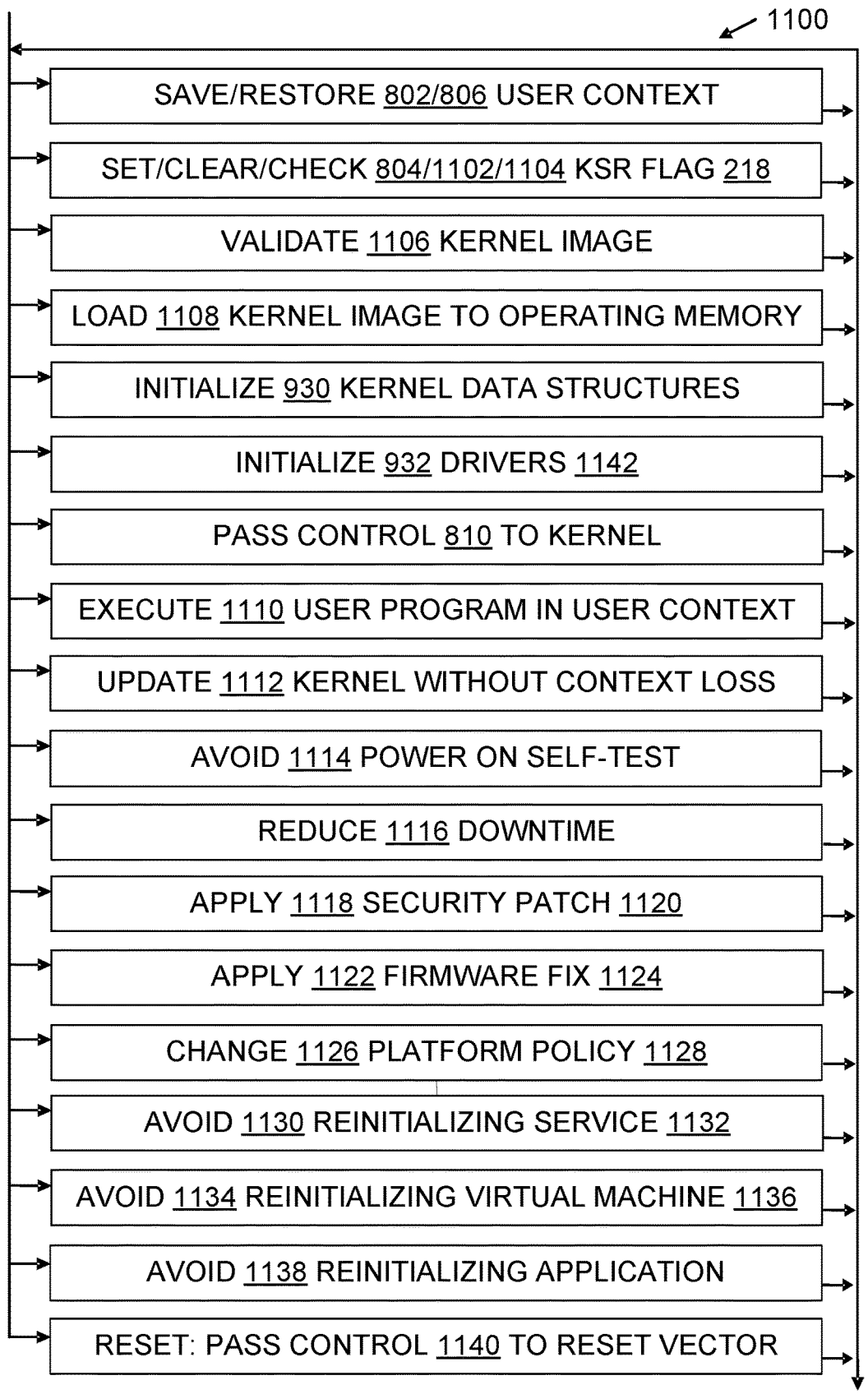
FIG. 11 is flow chart further illustrating aspects of some processes and configured storage media configured for use with KSR technology.

FIG. 11 illustrates some process and configured storage media embodiments in a flowchart 1100. Technical processes shown in the Figures or otherwise disclosed will be performed automatically, e.g., by suitable firmware 122 and kernel 120 software, unless otherwise indicated. Processes may also be performed in part automatically and in part manually to the extent action by a human administrator or other human person is implicated, e.g., to initiate 602 shutdown or to launch 938 applications. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 11. Steps may be performed serially, in a partially overlapping manner, or fully in parallel. The order in which flowchart 1100 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

In some embodiments, user context may be saved 802 by copying it to non-volatile storage. A hard disk may be used but better performance would be provided by using NVDIMM or other non-volatile storage that operates at dynamic RAM speeds instead of at slower hard disk speeds. User context may be subsequently restored 806 by copying it back from non-volatile storage into operating memory. Addresses within a user context are typically relative to a base address, not absolute, so little or no address adjustment will be needed if the restored location and the location from which the context was saved are not identical.

In some embodiments, the KSR indicator 218 may be set 804, cleared 1102, or checked 1104 using familiar access mechanisms.

In some embodiments, the kernel image to which KSR will pass control can be validated 1106 using checksums, hashes, and or familiar mechanisms to detect data corruption or tampering. That kernel image can be loaded 1108 using familiar mechanisms, adapted to load the kernel image without prior POST in the current reset.

In some embodiments, kernel data structures can be initialized 930 using familiar mechanisms, adapted to initialize the kernel image without prior POST in the current reset, that is, while avoiding 1114 POST, thus reducing 1116 downtime.

In some embodiments, device drivers 1142 can be initialized 932 using familiar mechanisms, adapted to initialize drivers without prior POST in the current reset.

In some embodiments, control can be passed 810 to a point in the kernel which permits the continued execution 1110 of launched applications, such as a main loop after kernel initialization. Using KSR permits updating 1112 a kernel without losing user context, e.g., by applying 1118 a security patch 1120. Even if the kernel is unchanged, a fix 1124 may be applied 1122 to the firmware 122, or a platform policy 1128 may be changed 1126, after user context is saved and before it is restored. Using KSR with user context restoration allows avoiding 1130 service 1132 reinitialization, avoiding 1134 virtual machine 1136 reinitialization, and avoiding 1138 application 124 reinitialization, thus reducing effective downtime, namely, time that is not spent making further progress in application or virtual machine execution.

In some embodiments, KSR can be implemented using modifications to boot software and the operating system, which are functionally spliced into the code performed before and after a reset 1140. Thus, the reset vector itself is unchanged.

Some embodiments use or provide a kernel soft reset method which includes boot software 220 of a device 102 checking 1104 a kernel soft reset indicator 218. Upon finding that the kernel soft reset indicator indicates a kernel soft reset is underway, the method loads 1108 a kernel image B into an operating memory of the device, initializes 930 kernel data structures 210 of the loaded kernel image B, and passes 810 control to the initialized kernel image B. Then the device executes 1110 at least a portion of at least one user program in a user context on top of the initialized kernel image B, the user context having been previously created during operation of the device under the control of a kernel image A. Thus, the method updates 1112 the device from kernel image A to kernel image B without losing the user context and with values updated in kernel data structures.

Some embodiments include validating 1106 the kernel image B before passing control to the initialized kernel image B.

Some embodiments include the following performed prior to the boot software of the device checking the kernel soft reset indicator: saving 802 a copy of the user context created under kernel image A to a non-volatile storage, and setting 804 the kernel soft reset indicator to indicate a kernel soft reset is underway. Then the following is performed prior to passing control to the initialized kernel image B: restoring 806 the user context from the non-volatile storage to the operating memory.

Some embodiments avoid 1114 performing a power on self-test 614 that is performed during a cold boot of the device.

In some embodiments, an elapsed time from a reset command to when the method passes control to initialized kernel image B is not more than 70% of an elapsed time from a powered-off state to perform a cold boot of the device which passes control to initialized kernel image B.

In some embodiments, the kernel soft reset method includes at least one of the following: applying 1118 a security patch to produce kernel image B from kernel image A; applying 1122 a fix to firmware of the device and using kernel image A as kernel image B; or changing 1126 a platform policy which is associated with at least one chipset sticky register.

In some embodiments, the kernel soft reset method includes at least one of the following: avoiding 1130 reinitializing a service by preserving or restoring the user context when passing to kernel image B in place of kernel image A; avoiding 1134 reinitializing a virtual machine 1136 by preserving or restoring the user context when passing to kernel image B in place of kernel image A; avoiding 1138 reinitializing an application by preserving or restoring the user context when passing to kernel image B in place of kernel image A.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a KSR indicator 218, code to save and restore user context, and code to avoid POST, in the form of data 118 and instructions 116, read from a removable medium 114 and/or another source such as a network connection, to form a configured medium. The configured medium 112 is capable of causing a computer system to perform technical process steps for KSR resets as disclosed herein. The Figures thus help illustrate configured storage media embodiments and process embodiments, as well as system and process embodiments. In particular, any of the process steps illustrated in FIG. 8, FIG. 10, FIG. 11, or otherwise taught herein, may be used to help configure a storage medium to form a configured medium embodiment.

Additional Details

In some implementations, kernel data structures may hold part of the user context, in data structures such as a valid virtual memory page table data structure, a valid list of active user processes, a valid list of active threads, a valid list of running or suspended auto-start services or drivers, a valid task scheduler queue data structure, current time zone information, an initialized file system driver data structure, a confirmation that operating memory hardware has been initialized, or an initialized driver. Unless indicated otherwise, however, user context does not include kernel data structures, at least not outside a hosted kernel within a virtual machine.

In some implementations, KSR-adapted BIOS 302 indicates the presence of an NVDIMM mailbox 218 to an operating system loader 618 during the boot process 1000, allowing KSR-targeting of various hardware, e.g., servers, phones, tablets, etc.

In some implementations, KSR-adapted operating system loader software detects (and optionally validates and/or cryptographically validates) OS context 208 stored in a predetermined area indicated by BIOS, and loads that image if found (or found and validated), allowing KSR-targeting of software running on various hardware systems 102.

In some implementations, a KSR-adapted operating system startup process saves a copy of the system context 208 or user context 216 or both, to the NVDIMM location indicated by the BIOS.

In some implementations, a KSR-adapted operating system shutdown process, rather than going through complete shutdown, partially performs the shutdown until it reaches a state that can be used to speed startup time, e.g., by avoiding POST.

In some implementations, a KSR-adapted operating system loader (startup) process detects (and optionally validates or cryptographically validates) OS context stored in a predetermined area indicated by a KSR-adapted BIOS, and loads that context if found (or found and validated). This allows KSR-targeting of software running on various hardware.

In some implementations, BIOS is KSR-adapted to detect existence of an OS context in a soft NVDIMM mailbox. In some, BIOS is KSR-adapted to validate the integrity of contents in the mail box. In some, BIOS is KSR-adapted to publish a flag (in ACPI or equivalent) which the KSR-adapted OS loader can use to determine whether OS context restoration should be attempted.

In some implementations, an OS is KSR-adapted. During shutdown or warm reset flows, the KSR-adapted OS saves application contexts to a software NVDIMM region (for example). During a restart sequence, the KSR-adapted OS will refer to an ACPI flag (for example) and determine whether OS boot 900 should be replaced by OS restoration 1000.

Some implementations protect OS memory/application context across system resets. Some isolate OS contexts in system memory space using a pre-boot memory map that is shared between pre-boot and OS. Some save OS contexts into a special purposed mailbox hosted in the software NVDIMM region. In some the OS load process is controlled by a special purpose flag populated by KSR-adapted BIOS, and boot time is optimized. Some replace an OS load process with an OS context restoration process.

In some implementations, a virtual machine 1136 is considered a user process. In some, tearing down virtual machines need not involve KSR flow; the tear-down can be accomplished at a VM level. Only the hypervisor and a base OS on which VMs run will be re-initialized 930. In one implementation, it is also possible to include other VMs into KSR flow. In some implementations, upon KSR shutdown the VMs are suspended to memory with state preserved, and the hypervisor (host OS) goes into a kernel soft reset. It closes handles on drivers and does a mini kernel shutdown, doing a respawn which initializes itself again.

In some implementations, shutdown system processes 608 includes operations such as freezing the memory associated with guest VMs. Some implementations power down the devices and restart new kernel initialization flow. The kernel initialization flow re-initializes drivers then resumes VMs that were preserved in memory. The memory is not torn down or destroyed, so boot time is dramatically reduced.

In some implementations, operations done during the load and initialize kernel and drivers step 620 involve previously suspending VMs in memory, preparing new kernel start, and released driver handles (closed devices). KSR kernel restarts by jumping to new kernel initialization (restart). Instead of restarting in power management state S3, a system adapted for KSR can power down as NVDIMM preserves memory. Upon restart the BIOS (UEFI) detects the NVDIMM shutdown and instead of the traditional load, a handoff is made to the new kernel start prepared as part of the KSR.

In some implementations, user context that gets saved to NVDIMM in the KSR aware flow includes all the application context other than the hypervisor and base OS. This includes all the memory context associated with guest VMs.

In some implementations, performing a warm reset 700 implies UEFI power-on-self-test phase is executed again, with some exceptions. Memory initialization is optimized as memory is in self refresh mode. For all practical purposes, memory map excluding the NVDIMM-SW region or other kernel reset memory is torn down and reconstructed afresh. System boot is forced to boot target from previous successful boot.

In some implementations, the copy from Memory for OS Usage 816 to NVDIMM 814 happens in the KSR aware flow shutdown path before control is transferred from the OS back to UEFI. In some, it is accomplished via a dedicated SMI handler implemented in UEFI that is aware of a warm reset request initiated by the OS context.

In some implementations, an OS uses a system memory map 812 to identify which memory regions to preserve for UEFI runtime functionality after the OS boot and which areas to reclaim for OS usage. In some, the memory map is developed across all phases of UEFI pre-boot. It changes as and when memory is allocated for storing code and data. The type of memory allocation varies based on type of code and data, e.g., boot services code, boot services data, runtime code, runtime data, ACPI NVS Memory, SMM etc.

In some implementations, KSR is different from hibernation in that KSR allows booting from one OS image to another OS image; hibernate and resume is from one OS image to the same OS image. In some, KSR saves specific end user context (i.e., services, VMs, applications), whereas hibernate saves kernel and user contexts (kernel, drivers, services, VMs, applications). In some implementations, KSR is different from hibernation in that KSR avoids POST, and hibernation resume does not. In some implementations a BIOS portion of a boot takes about 100 seconds and Windows® operating system boot takes about an additional 30 seconds, for a total reset time of about 130 seconds. By contrast, a warm reset takes about 40 seconds and then KSR operations such as context restore and kernel initialization take about 10 seconds, for a total of about 50 seconds, less than half the time of the conventional reset.

In some implementations, when an OS security patch is applied to a kernel image on a hard disk and KSR is invoked to load the new OS image, KSR loads the new kernel context from hard disk using winload.sys driver, and kernel init 930 and driver init 932 are performed. However, services, VMs, and applications are not reinitialized. Instead, their context is restored 806.

NVDIMM-SW

Some embodiments, address memory hierarchy gaps between volatile memory and conventional storage devices using Software Nonvolatile memory (NVDIMM-SW). When a system requires reset, end user contexts such as VMs, data, code, etc. are stored into Software-NVDIMM drives. Since this is a memory to software-NVDIMM copy, it happens at memory speeds and thus takes insignificant time. On reset, the system BIOS can go through traditional power on self-test flows (POST). Because the software NVDIMM regions are not mapped into system memory map, the data integrity is of OS/End-user data is not compromised. An ACPI hand off mechanism can be used whereby BIOS will indicate the presence of a software NVDIMM mailbox, which the OS loader can detect during early OS boot flow. If the OS successfully detects the system context, it restores OS context without requiring the delay and computational effort of loading kernel and user data from a physical storage location such as a hard disk. This may be considered a non-catastrophic kernel warm reset.

In some embodiments, the NVDIMM-SW is a firmware assisted means by which to emulate non-volatile DIMMs through coupling of DIMMs and block storage devices (NVMe or SATA etc.). A goal is to employ a standards driven approach and thus seamlessly publish NVDIMM-SW devices to the operating system. In a normal mode of operation, the pre-boot firmware publishes available NVDIMM-SW devices to the operating system. All the WRITE operations from applications taking advantage of NVDIMM-SW are targeted to DIMM regions associated with NVDIMM-SW. The SAVE # is initiated during either graceful or non-graceful shutdown scenarios. The SAVE # operation is completed before the system shutdown and subsequent restart. The RESTORE # operation is initiated by pre-boot firmware before control is given back to the operating system. NVDIMM-SW can be constructed by coupling DDR4 DIMMs and on-board M.2 NVMe modules. An NVDIMM-SW paradigm repurposes traditional DIMMs for emulating byte addressable memory. In some implementations, the system is populated with all DIMMs being the same size and memory type. NVDIMM-SW supports two modes of operation, i.e., either NVDIMM non-interleave or NVDIMM interleave. NVDIMM non-interleave where DIMMs on slot 1 will be selected as non-volatile NVDIMM (SW) NVDIMMs depending on the selected non-volatile memory size via the setup option. The maximum non-volatile memory size depends on the power duration during non-graceful save scenarios. Non-interleave NVDIMM-SW is much the same as NVDIMM-N except all I2C_DSM data are emulated instead. In NVDIMM interleave all DIMMs within a socket will be interleaved together to support NUMA. Also, the top memory of each socket is carved out as NVDIMM-SW from the system memory map based on the non-volatile memory size as selected. A goal of event handling is to attempt saving the data from volatile memory to a non-volatile memory region. Firmware stacks (UEFI, BMC) are also responsible for logging errors for both inband and out-of-band listeners.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8, 10 and 11 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which supports a kernel soft reset for updating a kernel without losing user context, the system comprising:
   a kernel image A;
   a user context generated during operation of the system under control of kernel image A, the user context including at least one initialization of a service which resulted in an initialized service;
   a kernel image B which differs from kernel image A;
   at least one processor;
   an operating memory in operable communication with the processor, the operating memory including volatile random access memory (RAM) and containing the user context and at least a portion of the kernel image A;
   a kernel reset memory, the kernel reset memory including non-volatile storage containing the kernel image B;
   a kernel soft reset indicator;
   a kernel validation code which upon execution performs a validation test on a copy of the user context; and
   boot software including code which upon execution checks the kernel soft reset indicator, and when the kernel soft reset indicator indicates a kernel soft reset is underway the code (a) loads the kernel image B from the kernel reset memory into the operating memory, (b) initializes kernel data structures of the kernel image B, and (c) passes control to the initialized kernel image B to continue operation of the system with the same user context under control of kernel image B rather than under control of kernel image A, including continued operation of the system under the same initialized service, and when the kernel soft reset indicator indicates a kernel soft reset is not underway the code does not pass control to kernel image B to continue operation of the system with the same user context.

2. The computing system of claim 1, wherein the kernel soft reset indicator comprises at least one of the following: a flag stored on a hard disk, a flag in a platform communication channel shared memory region, an advanced configuration and power interface flag.

3. The computing system of claim 1, wherein the boot software comprises at least one of the following: basic input/output (BIOS) software, unified extensible firmware interface (UEFI) software.

4. The computing system of claim 1, wherein the computing system comprises at least one of the following: a server computer, a cloud server, a datacenter server, a server configured to run multiple virtual machines, a smartphone, a tablet, a laptop, a desktop, a workstation, a video gaming system, a virtual reality system, an augmented reality system, a vehicle, an automated manufacturing system, a process control system, a robotic system, an embedded system.

5. The computing system of claim 1, wherein the kernel reset memory further comprises a non-volatile storage containing a copy of the user context, and the boot software further includes code which upon execution copies the user context from the kernel reset memory into the operating memory after loading the kernel image B from the kernel reset memory into the operating memory and before continuing operation of the system with the same user context under control of the initialized kernel image B.

6. The computing system of claim 5, wherein the kernel reset memory containing a copy of the user context comprises at least one of the following: NVDIMM-F memory, NVDIMM-N memory, NVDIMM-P memory, NVDIMM-SW memory, NVRAM memory.

7. The computing system of claim 1, wherein the boot software further includes code which performs a validation test on at least one of the following: the kernel image B, a copy of the user context.

8. The computing system of claim 1, wherein the kernel image B differs from the kernel image A with regard to at least one of the following characteristics: security, efficiency, correctness, usability, size, connectivity.

9. A kernel soft reset method comprising:
   boot software of a device checking a kernel soft reset indicator;
   upon finding that the kernel soft reset indicator indicates a kernel soft reset is underway, loading a kernel image B into an operating memory of the device;
   initializing kernel data structures of the loaded kernel image B;
   passing control to the initialized kernel image B;
   performing a validation test on a copy of a user context; and
   executing at least a portion of at least one user program in the validated user context on top of the initialized kernel image B, the user context previously created during operation of the device under the control of a kernel image A;
   whereby the method updates the device from kernel image A to kernel image B without losing the user context and with values updated in kernel data structures.

10. The kernel soft reset method of claim 9, further comprising validating the kernel image B before passing control to the initialized kernel image B.

11. The kernel soft reset method of claim 9,
   wherein the method further comprises the following performed prior to the boot software of the device checking the kernel soft reset indicator: saving a copy of the user context created under kernel image A to a non-volatile storage, and setting the kernel soft reset indicator to indicate a kernel soft reset is underway; and
   wherein the method further comprises the following performed prior to passing control to the initialized kernel image B: restoring the user context from the non-volatile storage to the operating memory.

12. The kernel soft reset method of claim 9, wherein the method avoids performing a power on self-test that is performed during a cold boot of the device.

13. The kernel soft reset method of claim 9, wherein an elapsed time from a reset command to when the method passes control to initialized kernel image B is not more than 70% of an elapsed time from a powered-off state to perform a cold boot of the device which passes control to initialized kernel image B.

14. The kernel soft reset method of claim 9, wherein the method comprises at least one of the following:
applying a security patch to produce kernel image B from kernel image A;
applying a fix to firmware of the device and using kernel image A as kernel image B; or
changing a platform policy which is associated with at least one chipset sticky register.

15. The kernel soft reset method of claim 9, wherein the method comprises at least one of the following:
avoiding reinitializing a service by preserving or restoring the user context when passing to kernel image B in place of kernel image A;
avoiding reinitializing a virtual machine by preserving or restoring the user context when passing to kernel image B in place of kernel image A;
avoiding reinitializing an application by preserving or restoring the user context when passing to kernel image B in place of kernel image A.

16. A server in a data center or a cloud computing facility, the server comprising:
a kernel image A;
a user context generated during operation of the server under control of kernel image A;
a kernel image B;
at least one processor;
an operating memory in operable communication with the processor, the operating memory including volatile random access memory (RAM) and containing the user context and at least a portion of the kernel image A;
a kernel reset memory, the kernel reset memory including non-volatile storage containing the kernel image B;
a kernel soft reset indicator;
a kernel validation code which upon execution performs a validation test on a copy of the user context; and
boot software which comprises basic input/output (BIOS) software or unified extensible firmware interface (UEFI) software or both, the boot software including code which upon execution checks the kernel soft reset indicator, and when the kernel soft reset indicator indicates a kernel soft reset is underway the code (a) loads the kernel image B from the kernel reset memory into the operating memory, (b) initializes kernel data structures in the kernel image B, and (c) passes control to the initialized kernel image B to continue operation of the server with the same user context under control of kernel image B, and when the kernel soft reset indicator indicates a kernel soft reset is not underway the code does not pass control to kernel image B to continue operation of the system with the same user context; and
wherein the server is further characterized in at least one of the following ways:
kernel image B is at most 90% the size on disk of kernel image A;
a fix was applied to firmware of the server after creation of the user context and prior to passage of control to the initialized kernel image B;
kernel image B differs from kernel image A at most in kernel initialization or driver initialization or both;
the user context includes an initialized service; or
an elapsed time from a reset command to when control passes to initialized kernel image B without performing a power on self-test is not more than 65% of an elapsed time from a powered-off state to perform a cold boot of the server which passes control to initialized kernel image B after a power on self-test.

17. The server of claim 16, wherein the kernel reset memory non-volatile storage comprises NVDIMM or NVRAM memory or both, and the boot software further includes code which upon execution copies the user context from the kernel reset memory non-volatile storage into the operating memory after loading the kernel image B from the kernel reset memory into the operating memory and before continuing operation of the system with the same user context under control of the initialized kernel image B.

18. The server of claim 16, wherein at least two of the following characterizations are correct:
kernel image B differs from kernel image A by a security patch;
kernel image B is at most 90% the size on disk of kernel image A;
kernel image B includes code which corrects a bug present in kernel image A;
a fix was applied to firmware of the server after creation of the user context and prior to passage of control to the initialized kernel image B;
kernel image B differs from kernel image A at most in kernel initialization or driver initialization or both;
the user context includes an initialized service;
the user context includes an initialized virtual machine;
the user context includes an initialized application;
an elapsed time from a reset command to when control passes to initialized kernel image B without performing a power on self-test is not more than 65% of an elapsed time from a powered-off state to perform a cold boot of the server which passes control to initialized kernel image B after a power on self-test.

19. The server of claim 18, wherein at least three of the characterizations are correct.

20. The server of claim 18, wherein at least five of the characterizations are correct.

* * * * *